Aug. 21, 1951

W. CERMAK 2,564,957

SELECTIVE TWO-BATTERY CHARGING SYSTEM
FOR VEHICLES AND THE LIKE

Filed Aug. 29, 1949

WILLIAM CERMAK
INVENTOR

BY *Joseph Blacker*

ATTORNEY

Aug. 21, 1951 W. CERMAK 2,564,957
SELECTIVE TWO-BATTERY CHARGING SYSTEM
FOR VEHICLES AND THE LIKE
Filed Aug. 29, 1949 2 Sheets-Sheet 2
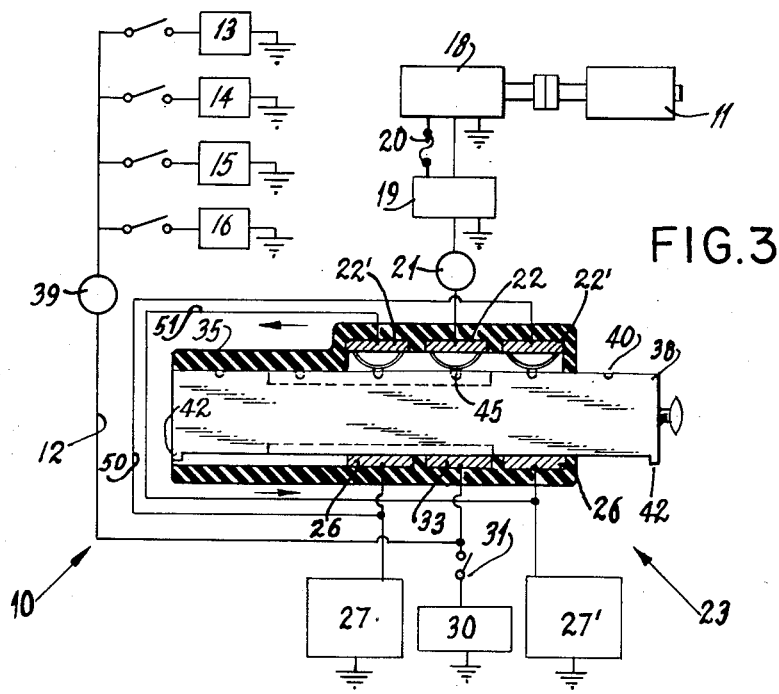
FIG.3
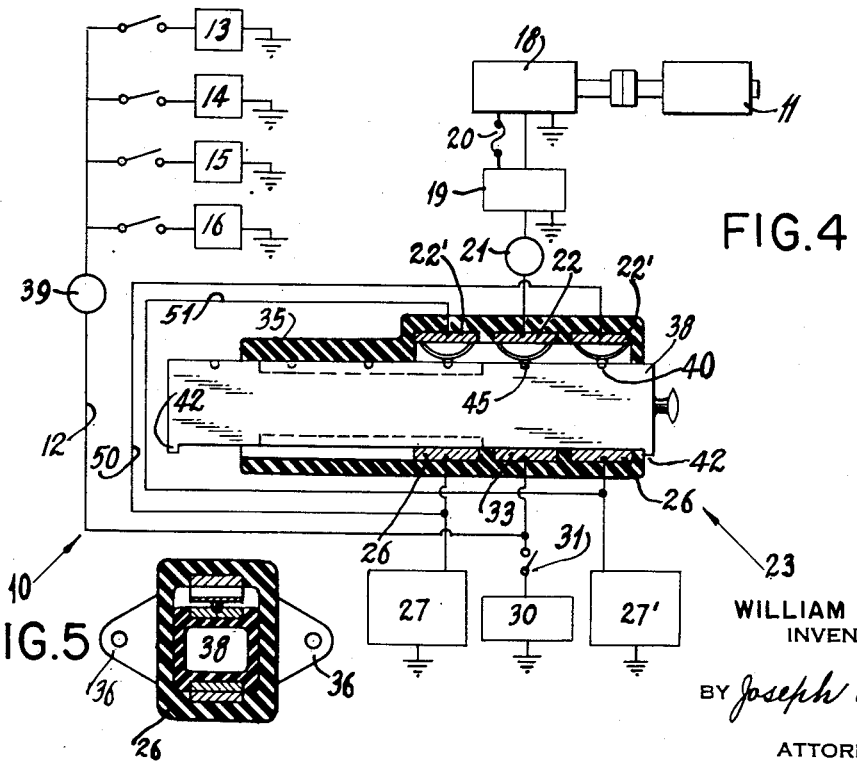
FIG.4
FIG.5
WILLIAM CERMAK
INVENTOR
BY Joseph Blacker
ATTORNEY Patented Aug. 21, 1951

2,564,957

UNITED STATES PATENT OFFICE 2,564,957

SELECTIVE TWO-BATTERY CHARGING SYSTEM FOR VEHICLES AND THE LIKE

William Cermak, New York, N. Y.

Application August 29, 1949, Serial No. 112,986

2 Claims. (Cl. 290—36)

1

This invention relates to an electrical system for power plants driven by internal combustion engines wherein a battery is charged by a generator.

In present conventional circuits for a power plant employing a generator for charging a battery, the load circuit is connected to the generator circuit before the ammeter. An object of this invention is to provide a simple and safety electrical system in which two independent batteries are employed and the user may selectively operate a switch to charge one battery while the other is being discharged, or whereby the user may selectively operate the switch to charge both independent batteries to supply increased current for the starting motor, the two batteries being in multiple or parallel so that the current capacity is doubled for ease of starting, while the generator circuit is not connected to the load circuit, whereby the electrical equipment in the load circuit cannot be damaged due to high voltage in the generator circuit, especially when there is an open circuit or loose connection in the generator circuit.

Another object of this invention is to provide a push-pull switch having a slidable member and bus bars, one of which has three contact notches, the slidable member also having three contact notches in the insulated portion thereof, the six notches permitting the switch to be set in three operating positions and in one off position.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is a cross-sectional view, similar to that shown in Figure 2, and showing two contacts in engagement with the bus bar, the right-hand battery being charged.

2

Figure 2:
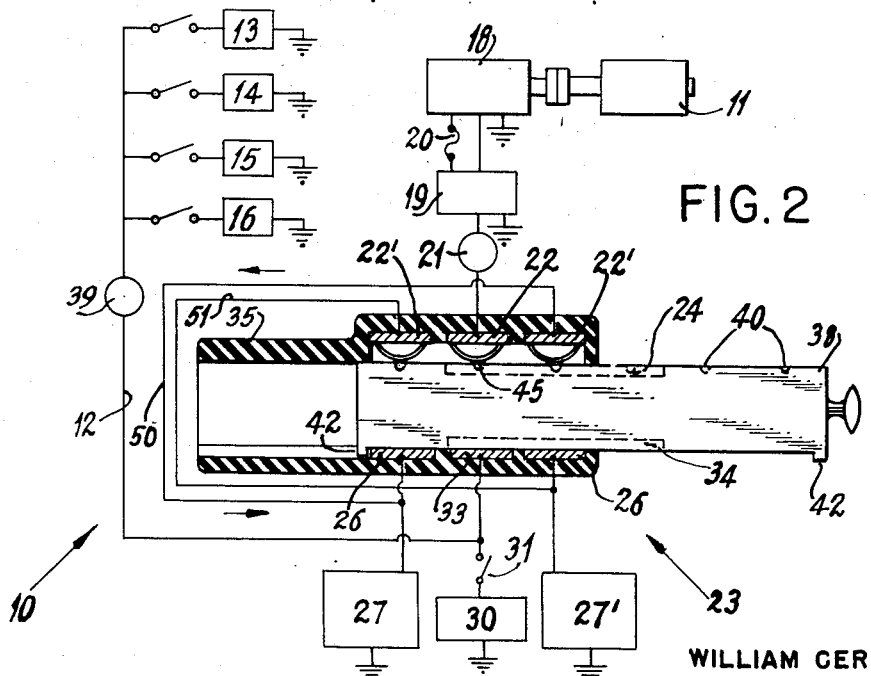
Figure 2 is a cross-sectional view, similar to that shown in Figure 1, but showing only two contacts in engagement with the bus bar, the section being taken on line 2—2 in Figure 5, the left-hand battery only being charged.

Figure 4 is a cross-sectional view, similar to that shown in Figures 2 and 3, and showing only one contact in engagement with the bus bar, the switch being in off position.

Figure 1:
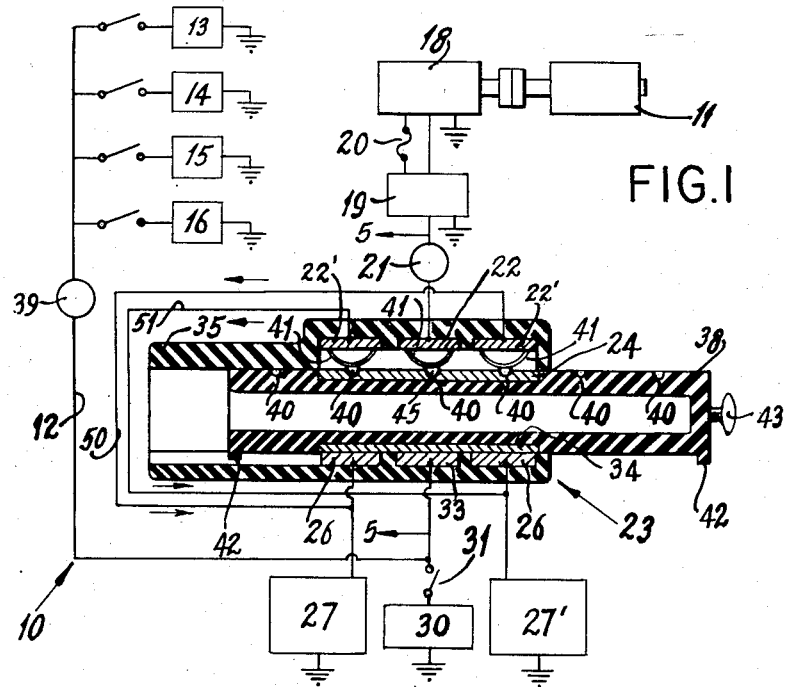
Figure 1 is a cross-sectional view, taken on line 1—1 in Figure 5, showing three contacts in engagement with a bus bar, two batteries being charged simultaneously.

Figure 5 is a cross-sectional view taken on line 5—5 in Figure 1.

In the illustrated embodiment of the invention, the numeral 10 indicates an electrical system for a power plant driven by an internal combustion motor or any suitable source of power indicated by the numeral 11. The electrical system comprises a normal load circuit 12 which operates the ignition 13, electric lights 14, and/or a heater 15 and/or a radio 16, when the respective switches are closed.

The electrical system comprises a generator 18, a voltage regulator current control and a cutout relay 19. A fuse 20 suitably arranged between the generator field circuit and the voltage regulator, protects the generator by breaking the field circuit when the generator output voltage is excessive. An ammeter 21 is placed in the line between the voltage regulator and current control 19 and the center contact 22 of an electrical circuit control switch preferably of the push-pull type 23.

The center contact 22 of the switch 23, as shown in Figure 1, transmits current to a bus bar 24 and through terminals 22' to contacts 26 and to two independent batteries 27, 27' which are connected in parallel and serve to supply current to a starting motor 30 through a starter switch 31.

It is to be noted that a bus bar 34 at the lower face of the switch 23 serves to connect both batteries 27, 27' with the lower center contact 33 which provides current to the starting motor 30 and the load circuit 12. The body 35 of the switch 23 has two arms 36 serving for suitable installation or mounting on the dash board of a motor vehicle, or any suitable accessible position. The switch 23 also comprises a slidable member 38 which carries the bus bars 24 and 34. The upper surface of the slidable member 38 has six notches 40 in equally spaced-apart relation. Three of the notches 40 are in the bus bar 24 and three notches are in the insulated upper surface of the slidable member. The notches 40 serve to receive and suitably interlock with the lower face portions of leaf springs 41 interposed between the contacts 22 and 22' and the bus bar 24. It is to be noted that the slidable member 38 may be shifted to selectively cause engagement with only three of the six notches 40.

It is to be noted that the load circuit 12 is connected to the live side of the starter switch 31. In the position of the switch 23, shown in Figure 1, both batteries 27 and 27' are being charged, and the load circuit 12 is supplied with current from both batteries. An ammeter 39 in the load circuit 12 may be used to indicate the amount of current consumption from the batteries while the ammeter 21 shows the amount of current delivered to the batteries.

The slidable member 38 has two end stops 42 serving to limit the strokes of the slidable member in either direction. A hand knob 43 is used for the manipulation of the slidable member.

It will be noted that the arrangement of the leaf springs 41 whereby they contact the bus bar 24 and whereby the bus bar 34 transmits current to the contacts 26 and 33 is such that the switch 23 is arcless under operating conditions.

It is to be noted that the gist of my invention is to make it possible to charge one of the batteries which may be considered as the spare battery while the vehicle is in operation and without the necessity for relying on a garage charging station to charge the spare battery. Due to the fact that the load circuit in my disclosure is not directly connected to the generator circuit, as is customary at present, the switch 23 diverts the generator output circuit selectively to one or the other of the batteries 27, 27', as shown in Figures 2 and 3.

I claim that with the installation of my selective electrical system and by the addition of another battery into the electrical system at present in use in motive vehicles, I prevent excess generator voltage from getting into or reaching the load circuit and damaging any equipment that may be in the load circuit at the time. I accomplish this safety features by removing the load circuit connection from the generator side of the ammeter and connecting the load circuit to the live side of the starting motor switch 31, as shown in Figures 1 to 4 inclusive.

It is to be noted that by the term "equipment" or "equipments" I mean to include the ignition, the lights, the horn and/or the heater and/or the radio.

In the drawings,

Figure 1 shows two contacts 22' and one contact 22 in engagement with the bus bar 24, two batteries being charged simultaneously.

Figure 2 shows only two contacts 22 and 22' in engagement with the bus bar 24, the left-hand battery 27 only being charged. The battery 27' supplies current to the load circuit 12 and to the starting motor 30.

Figure 3 shows only two contacts 22 and 22' in engagement with the bus bar 24, the right-hand battery 27' only being charged. The battery 27 supplies current to the load circuit 12 and to the starting motor 30.

Figure 4 shows only one contact 22' in engagement with the bus bar 24, the switch being in off position. Both batteries are disconnected.

It is to be noted that the switch 23 prevents arcing because the elongated bus bars 24 and 34 are always in sliding contact with the upper and lower contacts.

It is also to be noted that the semi-circular leaf springs 41 have lugs 45 fixed thereto. The springs 41 serve to press the lugs 45 into the notches 40 thereby forcing down the slidable member 38 and the bus bar 34 into positive engagement with the lower contacts 26, 26 and 33. This causes positive transmission of current to the starting motor 30.

It is to be noted that the batteries 27 and 27' are preferably of equal capacity and large enough to individually take care of the starter load.

The arrangement herewith shown for operating the safety electrical system comprises a push-pull switch which makes it possible to charge an additional independent battery that is presently merely carried along with the vehicle with the possibility of becoming inactive due to non-use.

This safety system I accomplish with great simplicity, merely with the addition of two parts, viz; a push-pull switch and a battery added to the equipment presently in use.

This safely system is particularly necessary in the case of trucks and busses engaged in long distance traffic, and which have to run a large part of the night during which there is a heavy drain on the single battery which is more than the generator capacity and therefore part of the energy consumed has to be supplied from the single battery.

In accordance with my invention the problem is solved by switching in another charged battery already in the safety circuit, which was charged selectively during the time when the load is light.

It is to be noted that with the arrangement shown in Figure 4 in the off position of the switch, both batteries are disconnected and the risk of fire from a short circuit anywhere in the wiring is eliminated. This also eliminates the accidental discharge of the batteries.

It is also to be noted that in the structure shown, wires 50 and 51 outside the switch 26 serve to transmit current from the terminals 22' to the batteries. The wires 50 and 51 carry the generator output current from the upper bus bar 24 to the lower bus bar 34.

It will be noted that the load circuit 12 is supplied with current directly from one or both batteries 27, 27'. The voltage from the batteries can not under any conditions be above the rated capacity of the batteries, that is, the normal rating which remains fixed and may be fixed at 6 volts or fixed at 12 volts, etc., the voltage remaining fixed. This fixed low voltage can not burn out any of the equipments in the load circuit. It is important to note that with the present installations wherein the load circuit is directly connected with the generator output circuit, the voltage may vary considerably when there is a loose connection and this excess voltage results in damage to the equipments in the load circuit. This damage I have prevented.

In accordance with the patent statutes I have described and illustrated the preferred embodiment of my invention, but it will be understood that various changes and modifications can be made therein without departing from the spirit of the invention as defined by the appended claims.

I claim:

1. In an electrical system for a power plant driven by an internal combustion motor, including a starting motor, a generator, a battery, a starting motor switch and a load circuit comprising equipments, said battery having a capacity sufficient to operate said starting motor; an additional and independent spare battery of equal capacity as said first battery, said batteries being arranged in multiple to double the current capacity while the voltage is constant, a two-pole electric switch connected in series with said generator and battery circuit, said electric switch being shiftable into a position electrically connecting said generator selectively with one of said batteries to charge said battery while the other battery is being discharged, the generator circuit being directly connected with the battery being charged while the other battery supplies current to the load, said equipments in said load circuit being directly supplied from the battery that is not on charge, the load circuit being connected directly to the circuit of the battery being discharged while the generator is connected to the battery being charged, thereby providing a safety feature, preventing excess generator voltage above battery voltage, due to a loose connection or open circuit from reaching the load circuit, and burning out the equipments, whereby an open circuit in the generator output line will not affect or damage the equipments in said load circuit.

2. In an electrical system for a power plant driven by an internal combustion motor, including a starting motor, a generator, a battery, a starting motor switch and a load circuit comprising equipments, said battery having a capacity sufficient to operate said starting motor; an additional and independent spare battery of equal capacity as said first battery, a two-pole electric switch connected in series with said generator and battery circuit, said electric switch being shiftable into a position electrically connecting said generator selectively with one of said batteries to charge said battery while the other battery is being discharged, the generator circuit being directly connected with the battery being charged while the other battery supplies current to the load circuit, said equipments in said load circuit being directly supplied from the battery that is not on charge, the load circuit being connected to the battery side of said starting motor switch, thereby providing a safety feature, preventing excess generator voltage above battery voltage, due to a loose connection or open circuit from reaching the load circuit and burning out the equipments whereby an open circuit in the generator output line will not affect or damage the equipments in said load circuit.

WILLIAM CERMAK.

REFERENCES CITED

The following references are of record in the file of this patent:

UNITED STATES PATENTS

| Number | Name | Date |
|---|---|---|
| 539,500 | Biddle | May 21, 1895 |
| 648,144 | Chamberlain | Apr. 24, 1900 |
| 663,664 | Suren | Feb. 26, 1901 |
| 901,423 | Cormick | Oct. 20, 1908 |
| 1,102,805 | Scharf | July 7, 1914 |
| 1,132,602 | Myers | Mar. 23, 1915 |
| 1,192,400 | Edison | July 25, 1916 |
| 1,289,272 | Rohman | Dec. 31, 1918 |
| 1,343,597 | Turbayne | June 15, 1920 |
| 1,468,096 | Young | Sept. 18, 1923 |
| 1,898,370 | Hughes et al. | Feb. 21, 1933 |
| 2,085,275 | Schmidt | June 29, 1937 |
| 2,152,405 | Dreischerf | Mar. 28, 1939 |
| 2,344,568 | Snyder | Mar. 21, 1944 |